(12) United States Patent  
Fedorov et al.

(10) Patent No.: US 8,603,205 B2  
(45) Date of Patent: Dec. 10, 2013

(54) DROPLET IMPINGEMENT CHEMICAL REACTORS AND METHODS OF PROCESSING FUEL

(75) Inventors: Andrei G. Fedorov, Atlanta, GA (US); Mark Varaday, Atlanta, GA (US); F. Levent Degertekin, Decatur, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 370 days.

(21) Appl. No.: 13/018,614

(22) Filed: Feb. 1, 2011

(65) Prior Publication Data

US 2011/0142753 A1 Jun. 16, 2011

Related U.S. Application Data

(62) Division of application No. 11/946,079, filed on Nov. 28, 2007, now Pat. No. 7,909,897.

(60) Provisional application No. 60/867,456, filed on Nov. 28, 2006, provisional application No. 60/968,376, filed on Aug. 28, 2007.

(51) Int. Cl.

| | |
|---|---|
| *B01J 7/00* | (2006.01) |
| *B01J 10/00* | (2006.01) |
| *B01J 10/02* | (2006.01) |
| *B01J 15/00* | (2006.01) |
| *H01M 8/06* | (2006.01) |
| *C01B 3/36* | (2006.01) |
| *C10J 3/46* | (2006.01) |

(52) U.S. Cl.  
USPC .................. 48/197 R; 48/61; 422/129

(58) Field of Classification Search  
USPC .................. 48/197, 197 R; 422/129  
See application file for complete search history.

(56) References Cited

U.S. PATENT DOCUMENTS

| | | | |
|---|---|---|---|
| 3,683,212 A | 8/1972 | Zoltan | 310/8.3 |
| 3,983,740 A | 10/1976 | Danel | |
| 3,997,113 A | 12/1976 | Pennebaker, Jr. | 239/708 |
| 5,306,412 A | 4/1994 | Whitehouse et al. | 204/450 |
| 5,811,062 A | 9/1998 | Wegeng et al. | |
| 5,945,678 A | 8/1999 | Yanagisawa | 250/423 F |
| 6,228,147 B1 | 5/2001 | Takahashi | 95/55 |
| 6,474,786 B2 | 11/2002 | Percin et al. | 347/54 |
| 6,541,676 B1 | 4/2003 | Franz et al. | 585/250 |
| 6,766,817 B2 | 7/2004 | da Silva | |
| 6,787,763 B2 | 9/2004 | De La Mora et al. | 250/287 |
| 6,797,945 B2 | 9/2004 | Berggren et al. | 250/288 |
| 6,805,846 B2 | 10/2004 | Philips | |
| 6,918,404 B2 | 7/2005 | Dias da Silva | |

(Continued)

FOREIGN PATENT DOCUMENTS

WO    WO 01/96019    12/2001

OTHER PUBLICATIONS

Kikas, et al.; Hydrogen Production in a Reverse-Flow Autothermal Catalytic Microreactor: From Evidence of Performance Enhancement to Innovative Reactor Design; Ind. Eng. Chem. Res., vol. 42, No. 25; pp. 6273-6279.

(Continued)

*Primary Examiner* — Matthew Merkling  
(74) *Attorney, Agent, or Firm* — Thomas | Horstemeyer, LLP

(57) ABSTRACT

Fuel processors, methods of using fuel processors, and the like, are disclosed.

15 Claims, 7 Drawing Sheets

(56) References Cited

U.S. PATENT DOCUMENTS

| | | |
|---|---|---|
| 7,066,586 B2 | 6/2006 | da Silva |
| 2001/0013579 A1 | 8/2001 | Andrien et al. |
| 2002/0168297 A1 | 11/2002 | Shvets et al. |
| 2002/0168308 A1 | 11/2002 | Loffler et al. |
| 2003/0021748 A1* | 1/2003 | Hwang et al. .............. 423/652 |
| 2003/0111599 A1 | 6/2003 | Staats |
| 2004/0192044 A1 | 9/2004 | Degertekin et al. |
| 2005/0045833 A1 | 3/2005 | Fischer et al. |
| 2005/0153344 A1 | 7/2005 | Diamond et al. |
| 2005/0199824 A1 | 9/2005 | Yamada et al. |

OTHER PUBLICATIONS

Kikas, et al.; Hydrogen Production in the Reverse-Flow Autothermal Catalytic Microreactor; $7^{th}$ Int. Conference on Microreaction Technology; Switzerland, Sep. 2003; pp. 1-3.

Kikas; et al.; Feedstock for Micro Fuel Cells: Efficient Hydrogen Production in the Reverse-Flow Autothermal Catalytic Microreactors with Fractal Structuring of the Catalytically Active Surface; Int. Synposium on Micro/Nano Scale Energy Conversion, Turkey, Apr. 2002; 3 pages.

Meacham; et al.; A Micromachined Ultrasonic Droplet Generator Based on a Liquid Horn Structure; Review of Scientific Instruments (submitted on Sep. 25, 2003); pp. 1-17.

Phillips, et al.; Catalyst Surface At a Fractal of Cost—A Quest for Optimal Catalyst Loading; Chemical Engineering Science, No. 58; 2003; pp. 2403-2408.

Presentation to Prospective Sponsors; Oct. 2003.

Klavs F. Jensen; Microreaction Engineering—Is Small Better?: Chemical Engineering Science, No. 56; 2001; pp. 293-3003.

Karnik, et al.; Towards a Palladium Micro-Membrane for the Water Gas Shift Reaction: Microfabrication Approach and Hydrogen Purification Results; Journal of Microelectromechanical Systems, vol. 12, No. 1; Feb. 2003; pp. 93-100.

Shu, et al.; Catalytic Palladium-Based Membrane Reactors: A Review; The Canadian Journal of Chemical Engineering, vol. 69, Oct. 1991; pp. 1036-1058.

Edwards, et al.; On-Board Hydrogen Generation for Transport Applications: the HotSpot™ Methanol Processor; Journal of Power Sources, No. 71; 1998; pp. 123-128.

Irving, et al.; Novel Catalytic Fuel Reforming with Advanced Membrane Technology; Proceedings of the 2001 DOE Hydrogen Program Review; NREL/CP-570-30535; 9 pages.

Han, et al.; Purifier-Integrated Methanol Reformer for Fuel Cell Vehicles; Journal of Power Sources, No. 86; 2000; pp. 223-227.

Kothare, et al.; An Integrated Chemical Reforming Microplant for Fuel Cell Applications; Integrated Microchemical Systems Laboratory, Lehigh University; Presentation from NSF website in 2002; 14 pages.

Quiram, et al.; Design Issues for Membrane-Based, Gas Phase Microchmical Systems; Chemical Engineering Sciences, No. 55; 2000, pp. 3065-3075.

Hsing, et al.; Simulation of Micromachined Chemical Reactors for Heterogeneous Partial Oxidation Reactions; Chemical Engineering Science, No. 55; 2000; pp. 3-13.

Tonkovich, et al.; Microchannel Reactors for Fuel Processing Applications. I. Water Gas Shift Reactor; Chemical Engineering Science, No. 54; 1999; pp. 2947-2951.

Fitzgerald, et al.; A Compact Steam Reforming Reactor for Use in an Automotive Fuel Processor; Proceedings of the Fourth International Conference on Microreaction Technology. 358-363. Atlanta, GA, 2000; pp. 1-5.

Tonkovich; et al.; The Catalytic Partial Oxidation of Methane in a Microchannel Chemical Reactor; Proceedings of the Second International Conference of Microreaction Technology, Mar. 1998, New Orleans, Louisiana; 11 pages.

Srinivasan, et al.; Chemical Performance and High Temperature Characterization of Micromachined Chemical Reactors; Transducers '97; 1997 International Conference on Solid-State Sensors and Actuators, Chicago, Jun. 16-19, 1997; pp. 163-166.

Blanks, et al.; Bidirectional Adiabatic Synthesis Gas Generator; Chemical Engineering Science, vol. 45, No. 8; 1990; pp. 2407-2413.

Ajmera, et al.; A Novel Cross-Flow Microreactor for Kinetic Studies of Catalytic Processes; Presented at the 5th International Microreactor Engineering and Technology Conference, May 2001; 10 pages.

Ben-Tullilah, et al.; Flow-Rate Effects in Flow-Reversal Reactors; Experiments, Simulations and Approximations; Chemical Engineering Science, vol. 58; 2003; pp. 1135-1146.

Yurii Sh. Matros; Forced Unsteady-State Processes in Heterogeneous Catalytic Reactors; The Canadian Journal of Chemical Engineering, vol. 74; Oct. 1996; pp. 566-579.

Arana, et al.; A Microfabricated Suspended-Tube Chemical Reactor for Thermally-Efficient Fuel Processing; REC. Jul. 9, 2002; JMEMS, 0900; pp. 1-31.

Success in R&D of Optimal, Small-Scale, High-Performance Fuel Cells for Portable Devices; Mar. 13, 2002; http://www.casio.com/corporate/pressroom.cfm?act=2&pr=553.

Meacham, et al.; A Micromachined Ultrasonic Droplet Generator Based on a Liquid Horn Structure; Review of Scientific Instruments (Accepted); Submitted in Oct. 2003; pp. 1-17.

Yuan, et al.; MEMS-Based Piezoelectric Array Microjet; Microelectronic Engineering, No. 66; 2003; pp. 767-772.

Brenn, et al.; Drop Formation From a Vibrating Orifice Generator Driven by Modulated Electrical Signals; Phys. Fluids, No. 9 (12); Dec. 1997; pp. 3658-3669.

Paul Calvert; Inkjet Printing for Materials and Devices; Chem. Mater., vol. 13; 2001; pp. 3299-3305.

Calvert, et al.; Chemical Solid Free-Form Fabrication: Making Shapes Without Molds; Chm. Mater., vol. 9; 1997; pp. 650-663.

Chen, et al.; A New Method for Significantly Reducing Drop Radius Without Reducing Nozzle Radius in Drop-On-Demand Drop Production; Physics of Fluids, vol. 14, No. 1; Jan. 2002; pp. L1-L4.

Heij, et al.; Characterisation of a fL Droplet Generator for Inhalation Drug Therapy; Sensors and Actuators, vol. 85; 2000; pp. 430-434.

Elrod, et al.; Nozzleless Droplet Formation With Focused Acoustic Beams; J. Appl. Phys. vol. 65 (I); May 1, 1989; pp. 3441-3447.

Percin, et al.; Micromachined Droplet Ejector Arrays; Review of Scientific Instruments, vol. 73, No. 12; Dec. 2002; pp. 4385-4389.

Percin, et al.; Piezoelectrically Actuated Flextensional Micromachined Ultrasound Droplet Ejectors; IEEE Translations on Ultrasonics, Ferroelectrics, and Frequency Control, vol. 49, No. 6; Jun. 2002; pp. 756-766.

Percin, et al.; Piezoelectric droplet ejector for ink-jet printing of fluids and solid particles; Review of Scientific Instruments; vol. 74, No. 2; Feb. 2003; pp. 1120-1127.

Ridley, et al.; All-Inorganic Field Effect Transistors Fabricated by Printing; Science; vol. 286; Oct. 22, 1999; pp. 746-749.

Tsai, et al.; The Role of Capillary Waves in Two-Fluid Atomization; Physc. Fluids, vol. 9, (10); Oct. 1997; pp. 2909-2918.

Hue P. Le; Progress and Trends in Ink-Jet Printing Technology; Journal of Imaging Science and Technology, vol. 42, No. 1; Jan./Feb. 1998; pp. 49-62.

Oennerfjord: "Picoliter Sample Preparation in Maldi-Tof MS Using a Micromachined Silicon Flow-Through Dispenser"; Analytical Chemistry, American Chemical Society. Columbus, US, vol. 70, No. 22, Nov. 15, 1998, pp. 4755-4760.

European search report dated Jul. 11, 2007.

French, et al.; Monodisperse Dried Microparticulate Injector for Analytical Instrumentation;Anal. Chem. 1994; vol. 66, No. 5; pp. 685-691.

Simon J. Gaskell; Electrosrpay: Principles and Practice; Journal of Mass Spectrometry; vol. 32; 1997; pp. 677-688.

Hager, et al.; Behavior fo Microscopic Liquid Drolets near A Strong Electrostatic Field: Droplet Electrospray; Ana. Chem. 1994; vol. 66, No. 9; May 1, 1994; pp. 1593-1594.

Hager, et al.; Droplet Electrospray Mass Spectrometry; Anl. Chem. 1994; vol. 66, No. 22; Nov. 15, 1994; pp. 3944-3949.

He, et al.; 337 nm Matrix-assisted Laser Desorption/Ionization fo Single Aerosol Particles; J. Mass Spectrom.; 1999; vol. 34; p. 909-914.

Iribarne, et al.; On the evaporation of small ions from charged droplets; J. Chem. Phys., vol. 64, No. 6, Mar. 15, 1976; pp. 2287-2294.

(56) References Cited

OTHER PUBLICATIONS

De Juan et al.; Charge and Size Distributions of Electrospray Drops; Journal of Colloid and Interface Science; vol. 186; 1997; pp. 280-293.

Kirlew, et al.; An evaluation of ultrasonic nebulizers as interfaces for capillary electrophoresis of inorganic anions and cations with inductively coupled plasma mass spectrometric detection; Spectrochimica Acta Part B 53; 1998; pp. 221-237.

Li, et al.; Transport, Manipulation and Reaction of Biological Cells On-Chip Using Electrokinetic Effects; Anal. Chem; 1997; vol. 69, No. 8; Apr. 15, 1997; pp. 1564-1568.

Li, et al.; Integration of Microfabricated Devices to Capillary Electrophoresis-Electrospray Mass Spectrometry Using a Low Dead Volume Connection: Application to Rapid Analyses of Proteolytic Digests; Anal. Chem. 1994; vol. 71, No. 15; Aug. 1, 1999; pp. 3036-3045.

Percin, et al.; Piezoelectric Droplet Ejector for Ink-Jet Printing of Fluids and Solid Particles; Review of Scientific Instruments, vol. 74, No. 2; Feb. 2003; pp. 1120-1127.

Ridley, et al.; All-Inorganic Field Effect Transistors Fabricated by Printing; Science, vol. 286; Oct. 22, 1999; pp. 746-749.

Wilm, et al.; Femtomole sequencing of proteins from polyacrylamide gels by nano-electrospray mass spectrometry; Nature; vol. 375; Feb. 1, 1999; pp. 466-469.

Xue, et al.; Multichannel Microchip Electrospray Mass Spectrometry; Anal. Chem. 1997; vol. 69, No. 3, Feb. 1, 1997; pp. 426-430.

Yamashita, et al.; Electrospray Ion Source. Another Variation on the Free-Jet Theme; The Journal of Physical Chemistry; vol. 88, No. 20, 1984; pp. 4451-4459.

Liu, et al.; Microfabricated Devices for Capillary Electrophoresis—Electrospray Mass Spectrometry; Anal. Chem. 1999; vol. 71, No. 15, Aug. 1, 1999; pp. 3258-3264.

Zhang, et al.; High-Throughput Microfabricated CE/ESI-MS: Automated Sampling from a Microwell Plate; Anal. Chem. 2001; vol. 73, No. 11, Jun. 1, 2001; pp. 2675-2681.

Barber, et al.; Fast-atom-bombardment mass spectra of enkephalins; The Biochemical Society; 1981; vol. 197; pp. 401-404.

Barber, et al.; Fast atom Bombardment of Solids (F.A.B.): A New Ion Source for Mass Spectrometry; J.C.S. Chem. Comm., 1981; pp. 325-327.

Martin Bell; Taylor Cones and Electrosprays: a potential technique for creating new monodisperse colloids; The 1998 NSF REU summer program at Ohio State University Dept. of Physics; pp. 1-8.

Berggren, et al.; Single-Pulse Nanoelectrospray Ionization; Anal. Chem. 2002; vol. 74, No. 14; pp. 3443-3448.

Bings, et al.; Microfluidic Devices Connected to Fused-Silica Capillaries with Minimal Dead Volume; Anal. Chm.; 199; vol. 71; pp. 3292-3296.

Chen, et al.; A new method for significantly reducing drop radius without reducing nozzle radius in drop-on-demand drop production; Physics of Fluids; vol. 14, No. 1; Jan. 2002; pp. L1-L4.

Frank Vanhaecke; Detection by ICP-Mass Spectrometry; Handbook of Elemental Speciation; Techniques and Methodology; 2003; pp. 281-312.

Heij, et al.; Characterisation of a fL droplet generator for inhalation drug therapy; Sensors and Actuators 85; 2000; pp. 430-434.

Desai, et al.; A MEMS Electrospray Nozzle for Mass Spectroscopy; Transducers '97; 1997 International Conference on Solid-State Sensors and Actuators; Chicago, Jun. 16-19, 1997; pp. 927-930.

Dole, et al.; Molecular Beams of Macroions; The Journal of Chemical Physics; vol. 49, No. 5; Sep. 1, 1968; pp. 2240-2249.

Feng, et al.; A Simple Nanoelectrospray Arrangement With Controllable Flowrate for Mass Analysis of Submicroliter Protein Samples; J AM Soc Mass Spectrom 2000; vol. 11; pp. 94-99.

International Search Report and Written Opinion, dated Oct. 6, 2008.

\* cited by examiner

DROPLET IMPINGEMENT CHEMICAL REACTORS AND METHODS OF PROCESSING FUEL

CROSS-REFERENCE TO RELATED APPLICATION

This application is a divisional application of copending U.S. Utility Application entitled "DROPLET IMPINGEMENT CHEMICAL REACTORS AND METHODS OF PROCESSING FUEL" filed on Nov. 28, 2007 and assigned Ser. No. 11/946,079, which claimed priority to a Provisional Patent Application No. 60/867,456 entitled "Fuel Impingement Planar-Array-Microreactor" filed Nov. 28, 2006; and U.S. Provisional Patent Application Ser. No. 60/968,376, entitled "Droplet Impingement Planar-Array-Microreactor" filed on Aug. 28, 2007, each of which are hereby incorporated by reference.

FEDERAL SPONSORSHIP

This invention was made with Government support under Contract/Grant No. UG03-0050 NRA 02-OBPR-03, awarded by the NASA. The Government has certain rights in this invention.

BACKGROUND

Small-scale chemical reactors have many potential applications where compactness, lightweight, and portability are required. One example is in the supply of hydrogen for portable fuel cells where the transport of compressed hydrogen is not practical. Higher energy storage densities are achieved by reforming liquid fuels such as methanol and ethanol to hydrogen and feeding the fuel cell directly. Using this to power electronic devices in the 1-100 W power range such as cell phones and laptop computers clearly demands a simple, small, and low-weight design to compete with current battery technology. Such distributed chemical processing may also be advantageous in processing toxic reagents where it may be safer to produce smaller amounts on site as they are needed rather than producing, transporting, and storing them in large quantities. In addition to compactness and portability, heat and mass transport limitations become less significant at smaller scales, allowing reactions to approach their intrinsic rate and for efficient heat transfer between reactor components.

SUMMARY

Briefly described, embodiments of this disclosure, among others, include fuel processors, methods of using fuel processors, and the like. One exemplary fuel processor, among others, includes: a first reservoir configured to store a first fluid; a first planar ejector array structure disposed in communication with the first reservoir to generate droplets of the first fluid; a first droplet ejection zone for receiving droplets ejected from the first planar ejector array structure; and a catalyst layer disposed on the opposite side of the first droplet ejection zone as the first planar ejector array structure, wherein the droplets of the first fluid interact with the catalyst layer to form products.

One exemplary method, among others, includes: providing a fuel processor as described herein; ejecting the first fluid through the first planar ejector array to form droplets of the first fluid; reacting the first fluid at the first catalyst layer to form a first set of reaction products, wherein the reaction products include $H_2$; and separating $H_2$ from the reaction products.

One exemplary method, among others, includes: providing a fuel processor as described herein; ejecting the first fluid through the first planar ejector array to form droplets of the first fluid; reacting the first fluid at the first catalyst layer to form a first set of reaction products, wherein the reaction products include $H_2$; dynamically changing and matching the rate of the droplet ejection from the first planar ejector array to a time scale of one or more of the transport, reaction, and separation processes; and separating $H_2$ from the reaction products.

Other apparatuses, systems, methods, features, and advantages of this disclosure will be or become apparent to one with skill in the art upon examination of the following drawings and detailed description. It is intended that all such additional apparatuses, systems, methods, features, and advantages be included within this description, be within the scope of this disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 9A is a graph illustrating steam reforming of methanol. FIG. 9B illustrates partial oxidation of methanol.

DETAILED DESCRIPTION

Figure 1:
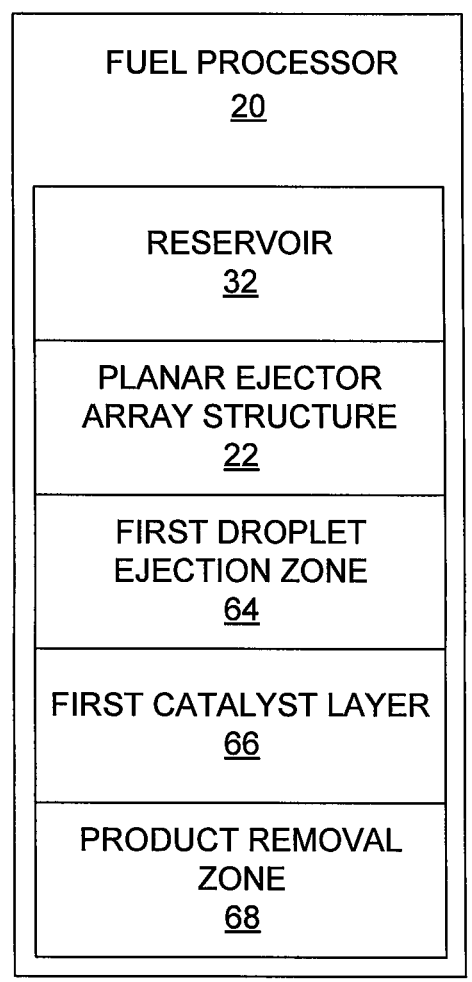
FIG. 1 is an illustration of main components of an embodiment of a fuel processor.

Embodiments of the present disclosure will employ, unless otherwise indicated, techniques of physics, material science, chemistry, and the like, which are within the skill of the art. Such techniques are explained fully in the literature and will not be detailed herein.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, surface coatings, manufacturing processes, dimensions, frequency ranges, applications, or the like, as such can vary. It is also to be understood that the terminology used herein is for purposes of describing particular embodiments only, and is not intended to be limiting. It is also possible in the present disclosure that steps can be executed in different sequence, where this is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Fuel processors and methods of producing hydrogen are disclosed. In general, embodiments of the present disclosure include a reservoir, a planar ejector array structure, a first droplet ejection zone, a first catalyst layer, and optionally a product removal zone. The reservoir is configured to store a fluid. The planar ejector array structure is disposed in communication with the reservoir configured to generate droplets from the fluid. The droplet ejection zone receives droplets ejected from the planar ejector array structure. The catalyst layer is disposed on the opposite side of the first droplet ejection zone as the planar ejector array structure. The droplets of the first fluid interact with the catalyst layer to form one or more products (e.g., $H_2$). The products can be moved or transported via the product removal zone.

Embodiments of the present disclosure can have a compact and planar design, which makes embodiments of the present disclosure suitable for generating hydrogen for a small-scale portable fuel cell. In addition, embodiments of the present disclosure offer a unique opportunity to integrate traditionally separate components to provide multiple functions in a compact package.

Embodiments of the present disclosure are advantageous since it may be desired to atomize the fluid for rapid evaporation, which is advantageous in a combustor or a fuel reformer generating hydrogen for a fuel cell. Atomization is also beneficial for a gas-liquid reaction where the conversion rate would increase significantly with decreasing droplet size. Embodiments of the present disclosure are advantageous when precise liquid flow rate control is needed for controlling the product formation rate, which is generally low in small-scale reactors. Producing an atomized liquid feed with precise flow rate control is thus important in certain small-scale reactor applications.

Embodiments of the present disclosure can be used to produce products such as hydrogen ($H_2$) from a fluid. The fluid can be liquids such as, but not limited to, water, methanol, ethanol, gasoline, diesel, and combinations thereof. The products that embodiments of the present disclosure are able to generate include, but are not limited to, hydrogen ($H_2$), water, carbon dioxide, carbon monoxide, hydrocarbons, and combinations thereof.

Embodiments of the fuel processor can operate under different conditions depending upon the fluid, the catalyst, the products, and the type of reaction. The types of reactions can include, but are not limited to, a steam reforming reaction, an oxidation reaction, a partial oxidation reaction, a water-gas shift reaction, a decomposition reaction, and combinations thereof. For example, if the fluid is methanol, the following reaction schemes illustrate the types of reactions that are expected to occur. Similar reactions occur for the other hydrocarbon fuels, and other reactions may be possible for other fluids listed above.

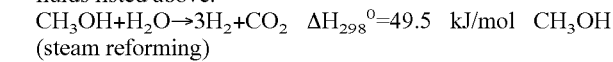
$CH_3OH+H_2O \rightarrow 3H_2+CO_2$  $\Delta H_{298}^{\circ}=49.5$ kJ/mol $CH_3OH$ (steam reforming)

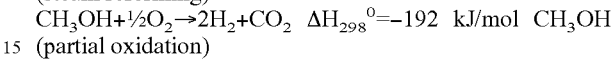
$CH_3OH+\frac{1}{2}O_2 \rightarrow 2H_2+CO_2$  $\Delta H_{298}^{\circ}=-192$ kJ/mol $CH_3OH$ (partial oxidation)

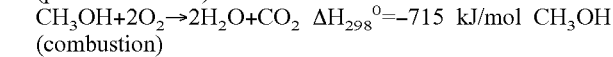
$CH_3OH+2O_2 \rightarrow 2H_2O+CO_2$  $\Delta H_{298}^{\circ}=-715$ kJ/mol $CH_3OH$ (combustion)

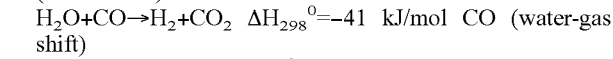
$H_2O+CO \rightarrow H_2+CO_2$  $\Delta H_{298}^{\circ}=-41$ kJ/mol CO (water-gas shift)

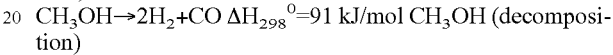
$CH_3OH \rightarrow 2H_2+CO$ $\Delta H_{298}^{\circ}=91$ kJ/mol $CH_3OH$ (decomposition)

There are considerations that must be weighed in deciding the specific reaction pathway taken in obtaining the desired products from a given fluid. In this regard, using the partial oxidation reaction may be useful since it produces hydrogen, it is fast, and heat is produced that can be used to drive the steam reforming reaction. Alternatively, combustion produces even more heat per unit of fuel used, but yields no hydrogen. In still another alternative, using only steam reforming yields the maximum amount of hydrogen per unit of fuel, but requires an external heat input. Thus, the fuel processor can operate under different conditions using one or a combination of reaction types.

FIG. 1 is an illustration of main components of an embodiment of a fuel processor 20. The fuel processor 20 includes, but is not limited to, a planar ejector array structure 22, a reservoir 32, a first droplet ejection zone 64, a first catalyst layer 66, and a product removal zone 68. A fluid (e.g., methanol) can be disposed in the reservoir 32 and in the planar ejector array structure 22. The fluid can be forced fluid out of the planar ejector array structure 22 producing droplets. The droplets impinge upon the first catalyst layer 66 and react to produce products. The remaining reactants and products can move into the product removal zone 68 to be transferred to another portion of the fuel processor 20 or out of the fuel processor 20.

The fluid can be atomized and made into droplets using a planar ejector array structure 22 that employs an atomization system such as, but not limited to, air-assisted atomization, pressure-swirl atomization, ink-jet atomization, thermal bubble atomization, ultrasonically driven atomization, and combinations thereof.

One particular embodiment that enables low power input atomization is resonant, ultrasonically driven atomization which operates by providing an AC electrical signal to the actuator (piezoelectric transducer) with a frequency equal to the resonance of the fluid filled cavity (reservoir and set of ejector structures). The resonant acoustic wave in the fluid is focused by the ejector structure (e.g., pyramidal nozzles), creating a high pressure gradient at the ejector structure nozzle exit, and thus ejecting a droplet at every cycle of the acoustic wave. Since the ejector structures can be fabricated using micromachining techniques the orifice size is well controlled, resulting in monodisperse droplet ejection for precise flow rate control. Additional details regarding ultrasonically driven atomization are described in reference to FIGS. 2A-7 and publications (Meacham, J. M., Ejimofor, C., Kumar, S., Degertekin F. L., and Fedorov, A., 2004, "A Micromachined Ultrasonic Droplet Generator Based on Liquid Horn Structure", *Review of Scientific Instruments*, Vol. 75, No. 5, pp. 1347-1352; Meacham, J. M., Varady, M., Degertekin F. L., and Fedorov, A., 2005, "Droplet Formation and Ejection from a Micromachined Ultrasonic Droplet Generator: Visualization and Scaling", *Physics of Fluids*, Vol. 17, No. 10, pp. 100605-100613; Meacham, J. M., Varady, M., Esposito, D., Degertekin, F. L., and Fedorov, A., "A Micromachined Ultrasonic Atomizer For Liquid Fuels", *Atomization and Sprays*, 18, pp. 163-190 (2008)), each of which is incorporated herein by reference.

Air-assisted atomization includes streams of air (or another gas) that are used to break up a thin liquid film of a fluid into droplets and carry them from the surface (See, Development of Micro-Machining Techniques for Air-Assisted Liquid Atomization, *Exp. Therm. Fluid Sci.*, vol. 20, 11-18, 1999, which is incorporated herein by reference). Pressure-swirl atomization, which is commonly used in gas turbines, includes a liquid that flows tangentially into a circular chamber from the outer edge and exits from a small orifice in the center of the chamber as a cone of droplets (See, Micromachined Silicon Fuel Atomizers for Gas Turbine Engines, *Atom. Sprays*, vol. 8, pp. 405-418, 1998, which is incorporated herein by reference).

The reservoir 32, the first droplet ejection zone 64, the first catalyst layer 66, and the product removal zone 68 are discussed in more detail in reference to FIGS. 2A-7. A specific non-limiting embodiment of the planar ejector array structure 22 is described in FIGS. 2A-7. Although FIGS. 2A-7 refer to ultrasonically driven atomization, each embodiment described in FIGS. 2A-7 could use one or a combination of atomization techniques described above. Thus, embodiments of the present disclosure are not limited to the use of ultrasonically driven atomization, but rather embodiments of the present disclosure include the use of other atomization techniques such as those described herein. The use of ultrasonically driven atomization in reference to FIGS. 2A-7 illustrates embodiments of how the fuel processor operates and this operation can be extended to the understanding of how other atomization techniques operate in embodiments of the fuel processors.

Figure 2A:
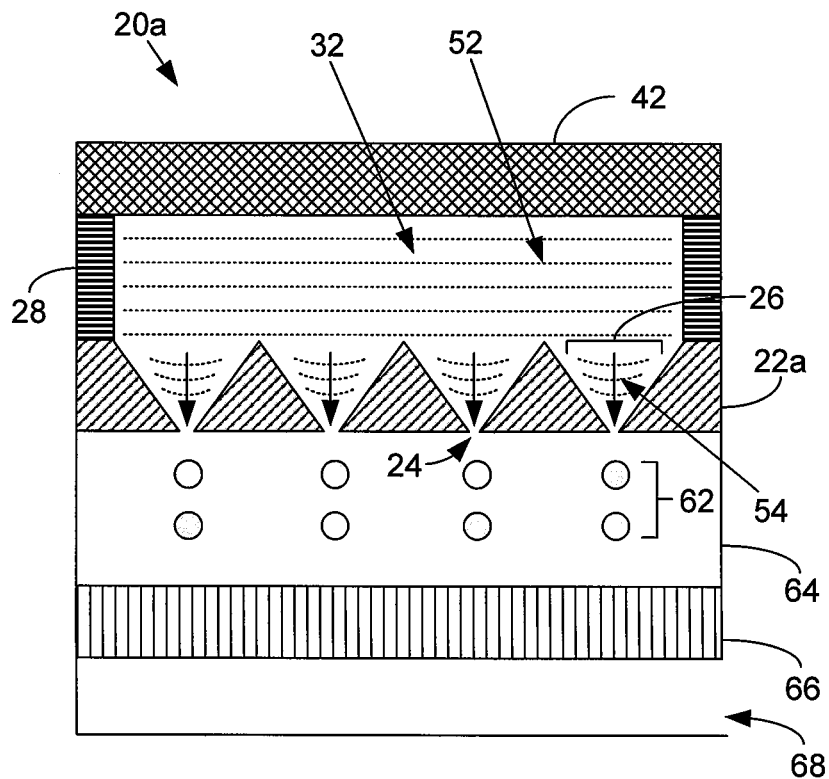
FIG. 2 is an illustration of a cross-section of another embodiment of a fuel processor.

FIG. 2A is an illustration of a cross-section of an embodiment of a fuel processor 20a. The fuel processor 20a includes, but is not limited to, a planar ejector array structure 22a including ejector structures 26, a separating layer 28, a reservoir 32, an actuator 42, a first droplet ejection zone 64, a first catalyst layer 66, and a product removal zone 68. A fluid (e.g., methanol) can be disposed in the reservoir 32 and in the planar ejector array structure 22a of ejector structures 26. Upon actuation of the actuator 42, a resonant ultrasonic wave 52 can be produced within the reservoir 32 and the fluid (not shown). The resonant ultrasonic wave 52 couples to and transmits through the fluid and is focused by the ejector structures 26 to form a pressure gradient 54 within the ejector structure 26. The high-pressure gradient 54 forces fluid out of the ejector structure 26 producing droplets 62. The frequency of the drive signal applied to the actuator 42 dictates, at least in part, the rate at which the droplets 62 are discretely produced. In other words, the droplets are produced either discretely (e.g., drop-on-demand), or as a continuous jet.

Embodiments of the present disclosure can be used in a continuous flow online operation and/or in discrete off-line operation. In discrete off-line operation, embodiments of the present disclosure can include a disposable nozzle system (e.g., array of nozzle systems that can include the fluid) that can be charged with one or more fluids and inserted into embodiments of the present disclosure. The disposable nozzle system can be removed and replaced with another disposable nozzle system, which is advantageous in some single-use applications.

A drop-on-demand ejection can be achieved by modulation of the actuation signal in the time domain. The actuator 42 generating ultrasonic waves can be excited by a finite duration signal with a number of sinusoidal cycles (a tone burst) at the desired frequency. Once a certain energy level is reached for droplet ejection, during the initial cycles of this signal, the standing acoustic wave pattern in the resonant cavity is established and the energy level is brought up to the ejection threshold. The number of cycles required to achieve the threshold depends on the amplitude of the signal input to the wave generation device and the quality factor of the cavity resonance. After the threshold is reached, one or more droplets 62 can be ejected in a controlled manner by reducing the input signal amplitude after the desired number of cycles. This signal can be used repetitively, to eject a large number of droplets 62. Another useful feature of this operation is to reduce the thermal effects of the ejection, since the device can cool off when the actuator 42 is turned off between consecutive ejections. The ejection speed can also be controlled by the amplitude and duration of the input signal applied to the actuator 42.

The planar ejector array structure 22a can include, but is not limited to, an ejector nozzle 24 and an ejector structure 26. In general, the material that the planar ejector array structure 22a is made of has substantially higher acoustic impedance as compared to the fluid. The planar ejector array structure 22a can be made of materials such as, but not limited to, single crystal silicon (e.g., oriented in the (100), (010), or (001) direction), metals (e.g., aluminum, copper, and/or brass), plastics, silicon oxide, silicone nitride, and combinations thereof.

The ejector structure 26 can have a shape such as, but not limited to, conical, pyramidal, or horn-shaped with different cross-sections. In general, the cross-sectional area is decreasing (e.g., linear, exponential, or some other functional form) from a base of the ejector nozzle 26 (broadest point adjacent the reservoir 32) to the ejector nozzle 24. The cross sections can include, but are not limited to, a triangular cross-section (as depicted in FIG. 2*a*), and exponentially narrowing. In an embodiment, the ejector structure 26 is a pyramidal shape.

The ejector structure 26 has acoustic wave focusing properties in order to establish a highly-localized, pressure maximum substantially close to the ejector nozzle 24. This results in a large pressure gradient at the ejector nozzle 24 since there is effectively an acoustic pressure release surface at the ejector nozzle 24. Since the acoustic velocity is related to the pressure gradient through Euler's relation, a significant momentum is transferred to the fluid volume close to the ejector nozzle 24 during each cycle of the acoustic wave in the ejector structure 26. When the energy coupled by the acoustic wave in the fluid volume is substantially larger than the restoring energy due to surface tension, viscous friction, and other sources, the fluid surface is raised from its equilibrium position. Furthermore, the frequency of the waves should be such that there is enough time for the droplet to break away from the surface due to instabilities.

The ejector structure 26 has a diameter (at the base) of about 50 micrometers to 5 millimeters, 300 micrometers to 1 millimeter, and 600 micrometers to 900 micrometers. The distance (height) from the ejector nozzle 24 to the broadest point in the ejector structure 26 is from about 20 micrometers to 4 millimeters, 200 micrometers to 1 millimeter, and 400 micrometers to 600 micrometers.

The ejector nozzle 24 size and shape effectively determine the droplet size and the amount of pressure focusing along with the ejector structure 26 geometry (i.e., cavity geometry). The ejector nozzle 24 can be formed using various micromachining techniques as described below and can have a shape such as, but not limited to, circular, elliptic, rectangular, and rhombic. The ejector nozzle 24 has a diameter of about 50 nanometers to 50 micrometers, 200 nanometers to 30 micrometers, and 1 micrometer to 10 micrometers.

The planar ejector array structure 22a can include one ejector nozzle 24 (not shown), an (one-dimensional) array of ejector nozzles 24, or a (two dimensional) matrix of parallel arrays of ejector nozzles 24. As shown in FIG. 2A, the ejector structure 26 can include one ejector nozzle 24 each or include a plurality of ejector nozzles 24 in a single ejector structure 26.

The separating layer 28 is disposed between the planar ejector array structure 22a and the actuator 46. The separating layer 28 can be fabricated of a material such as, but not limited to, silicon, metal, rubber, and plastic. The separating layer 28 is from about 50 micrometers to 5 millimeters in height (i.e., the distance from the actuator 42 to the planar ejector array structure 22), from about 200 micrometers to 3 millimeters in height, and from about 500 micrometers to 1 millimeter in height.

The reservoir 32 is substantially defined by the separating layer 28, the planar ejector array structure 22a, and the actuator 42. In general, the reservoir 32 and the ejector structures 26 include the fluid. The reservoir 32 is an open area connected to the open area of the ejector structures 26 so that fluid flows between both areas. In addition, the reservoir 32 can also be in fluidic communication (not shown) with microfluidic structures capable of flowing fluid into the reservoir 32.

In general, the dimensions of the reservoir 32 and the ejector structure 26 can be selected to excite a cavity resonance in the fuel cell at a desired frequency. The structures may have cavity resonances of about 100 kHz to 100 MHz, depending, in part, on fluid type and dimensions and cavity shape, when excited by the actuator 42.

The dimensions of the reservoir 32 are about 100 micrometers to 4 centimeters in width, about 100 micrometers to 4 centimeters in length, and about 100 nanometers to 5 centimeters in height. In addition, the dimensions of the reservoir 32 are about 100 micrometers to 2 centimeters in width, about 100 micrometers to 2 centimeters in length, and about 1 micrometer to 3 millimeters in height. Further, the dimensions of the reservoir 32 are about 200 micrometers to 1 centimeter in width, about 200 micrometers to 1 centimeter in length, and about 100 micrometers to 2 millimeters in height.

The actuator 42 produces a resonant ultrasonic wave 52 within the reservoir 32 and fluid. As mentioned above, the resonant ultrasonic wave 52 couples to and transmits through the liquid and is focused by the ejector structures 26 to form a pressure gradient 54 within the ejector structure 26. The high-pressure gradient 54 accelerates fluid out of the ejector structure 26 to produce droplets. The droplets are produced discretely in a drop-on-demand manner. The frequency in which the droplets are formed is a function of the drive cycle applied to the actuator 42 as well as the fluid, reservoir 32, ejector structure 26, and the ejector nozzle 24.

An alternating voltage is applied (not shown) to the actuator 42 to cause the actuator 42 to produce the resonant ultrasonic wave 52. The actuator 42 can operate at about 100 kHz to 100 MHz, about 500 kHz to 15 MHz, and about 800 kHz to 5 MHz. A direct current (DC) bias voltage can also be applied to the actuator 42 in addition to the alternating voltage. In embodiments where the actuator 42 is piezoelectric, this bias voltage can be used to prevent depolarization of the actuator 42 and also to generate an optimum ambient pressure in the reservoir 32. In embodiments where the actuator 42 is electrostatic, the bias voltage is needed for efficient and linear operation of the actuator 42. Operation of the actuator 42 is optimized within these frequency ranges in order to match the cavity resonances, and depends on the dimensions of and the materials used for fabrication of the reservoirs 32 and the planar ejector array structure 22a as well the acoustic properties of the fluids inside the ejector.

In addition to generation of acoustic pressure waves for droplet ejection, the actuator can provide a pumping action to supply fluid from an external environment into the reservoir 32 and the ejector structure 26.

The actuator 42 can include, but is not limited to, a piezoelectric actuator and a capacitive actuator. The piezoelectric actuator and the capacitive actuator are described in X. C. Jin, I. Ladabaum, F. L. Degertekin, S. Calmes and B. T. Khuri-Yakub, "Fabrication and Characterization of Surface Micromachined Capacitive Ultrasonic Immersion Transducers", IEEE/ASME Journal of Microelectromechanical Systems, 8, pp. 100-114, 1999 and Meacham, J. M., Ejimofor, C., Kumar, S., Degertekin F. L., and Fedorov, A., "A Micromachined Ultrasonic Droplet Generator Based on Liquid Horn Structure", Rev. Sci. Instrum., 75 (5), 1347-1352 (2004), which are incorporated herein by reference.

The dimensions of the actuator 42 depend on the type of actuator used. For embodiments where the actuator 42 is a piezoelectric actuator, the thickness of the actuator 42 is determined, at least in part, by the frequency of operation and the type of the piezoelectric material. The thickness of the piezoelectric actuator is chosen such that the thickness of the actuator 42 is about half the wavelength of longitudinal waves in the piezoelectric material at the frequency of operation. Therefore, in case of a piezoelectric actuator, the dimensions of the actuator 42 are about 100 micrometers to 4 centimeters in width, about 10 micrometers to 1 centimeter in thickness, and about 100 micrometers to 4 centimeters in length. In addition, the dimensions of the actuator 42 are about 100 micrometers to 2 centimeters in width, about 10 micrometers to 5 millimeters in thickness, and about 100 micrometers to 2 centimeters in length. Further, the dimensions of the actuator 42 are about 100 micrometers to 1 centimeter in width, about 10 micrometers to 2 millimeters in thickness, and about 100 micrometers to 1 centimeter in length.

In embodiments where the actuator 42 is an electrostatic actuator, the actuator 42 is built on a wafer made of silicon, glass, quartz, or other substrates suitable for microfabrication, where these substrates determine the overall thickness of the actuator 42. Therefore, in case of a microfabricated electrostatic actuator, the dimensions of the actuator 42 are about 100 micrometers to 4 centimeters in width, about 10 micrometers to 2 millimeter in thickness, and about 100 micrometers to 4 centimeters in length. In addition, the dimensions of the actuator 42 are about 100 micrometers to 2 centimeters in width, about 10 micrometers to 1 millimeter in thickness, and about 100 micrometers to 2 centimeters in length. Further, the dimensions of the actuator 42 are about 100 micrometers to 1 centimeter in width, about 10 micrometers to 600 micrometers in thickness, and about 100 micrometers to 1 centimeter in length. The first droplet ejection zone 64 is an area adjacent the planar ejector array structure 22a and the ejector structures 26. The first droplet ejection zone 64 is capable of receiving the droplets 64 from the ejector structures 26. The first droplet ejection zone 64 can be a closed-in area or have the capacity to flow gas into and/or out of the first droplet ejection zone 64. In an embodiment, a gas (e.g., air, $O_2$, $CH_4$, and the like) could be flowed into the first droplet ejection zone 64.

The first droplet ejection zone 64 has a length and width similar to that of the ejector structure 26 and the catalyst layer 66. In this regard, the length or diameter of the first droplet ejection zone is about 1 millimeter to 50 centimeters, about 1 centimeter to 10 centimeters, and about 3 centimeters to 6 centimeters. The height (from the ejector structure 26 to the first catalyst layer 66) of the first droplet ejection zone 64 is about 10 micrometers to 5 centimeters, about 100 micrometers to 5 millimeters, and about 500 micrometers to 1 millimeter. The sides of the first droplet ejection zone 64 not bound by the ejector structure 26 and the first catalyst layer 66 can be bound by one or more structures made of materials similar to that of the separating layer 28.

The first catalyst layer 66 is a boundary to a portion of the first droplet ejection zone 64 on the side opposite the ejector structure 26. In another embodiment, the position of the first catalyst layer 66 can be changed. The first catalyst layer 66 includes one or more catalyst materials. The droplets 62 ejected from the ejector structure 26 are directed towards the first catalyst layer 66. The components of the droplet 62 interact (e.g., vaporize and react) with the catalyst material of the first catalyst layer as described herein.

The catalyst material can be selected based on the first fluid, the reaction type, and the reaction kinetics of the first fluid with the catalyst. For example, in an embodiment for the combustion of a first fluid (e.g., methanol), the catalyst material can be $Pt/Al_2O_3$. In another embodiment, the reaction is methanol steam reforming so $Cu/ZnO/Al_2O_3$ pellets can be used as the catalyst material. In another embodiment, two or more catalysts could be used in the first catalyst layer. It should also be noted that heat might be needed to initiate and/or sustain one or more chemical reactions. In this regard, heat can be supplied by chemical reactions involving the first fluid, by heating the first catalyst layer 66 or portions thereof, heat transfer from a portion of the first catalyst layer 66 to another (or between/among catalyst layers when two or more catalyst layers are included in the fuel processor) and/or introducing heating gas into the first droplet ejection zone 64 or electrical resistance heaters.

The catalyst material can include an oxidation catalyst, a reforming catalyst, a water-gas shift catalyst, a decomposition catalyst, a CO preferential oxidation (PROX) catalyst, and combinations thereof. The oxidation catalyst can include, but is not limited to, $Pt/Al_2O_3$, $Rh/Ce/Al_2O_3$, and $Cu/ZnO/Al_2O_3$. The reforming catalyst can include, but is not limited to, $Cu/ZnO/Al_2O_3$, $Pd/Zn/Al_2O_3$, $Ni/Al_2O_3$, and the like. The water-gas shift catalyst reduces the amount of carbon monoxide in the products and produces additional hydrogen from unreacted carbon dioxide and steam. The water-gas shift catalyst can include, but is not limited to, $Cu/ZnO/Al_2O_3$, Fe—$Cr/Al_2O_3$, and the like. The decomposition catalyst can include, but is not limited to, $Ni/SiO_2$ $Ni/Al_2O_3$, and the like. The PROX catalyst can include, but is not limited to, Pt—$Fe/Al_2O_3$ and Pt—$Rh/Al_2O_3$.

The catalyst material can be disposed on or integrated within a material or material support. The material support can include, but is not limited to, porous ceramic, ceramic foam, metallic mesh, and combinations thereof. The material can include, but is not limited to, $Al_2O_3$, steel, aluminum, copper, and combinations thereof.

The first catalyst layer 66 has a length and width similar to that of the ejector structure 26 and the catalyst layer 66. In this regard, the length or diameter of the first droplet ejection zone is about 1 millimeter to 50 centimeters, about 1 centimeter to 10 centimeters, about 3 centimeters to 6 centimeters. The height or thickness of the first catalyst layer 66 depends greatly on the kinetics of the particular reaction occurring and the desired throughput and is about 100 micrometers to 5 centimeters, about 500 micrometers to 2 centimeters, and about 1 millimeter to 5 millimeters.

The product removal zone 68 is in gaseous communication (e.g., one or more gases flow from the first catalyst layer 66 to the product removal zone 68) with the first catalyst layer 66 and the first droplet ejection zone 64. The reactants, products, and/or gases present in the first droplet ejection zone 64 can flow into the product removal zone 68 and be transported out of the fuel processor 20*a* and/or to another portion of the fuel processor 20*a*. The product removal zone 68 has a length and width similar or greater than that of the ejector structure 26, first droplet ejection zone 64, and the catalyst layer 66. In this regard, the length or diameter of the first droplet ejection zone is about 1 millimeter to 50 centimeters, about 1 centimeter to 10 centimeters, about 3 centimeters to 6 centimeters.

It should be noted that heat could be provided via a chemical reaction, via heated gas, and/or heating catalyst layers by electrical resistance heaters or other methods, and/or other components of the fuel processor 20*a*.

Figure 2B:
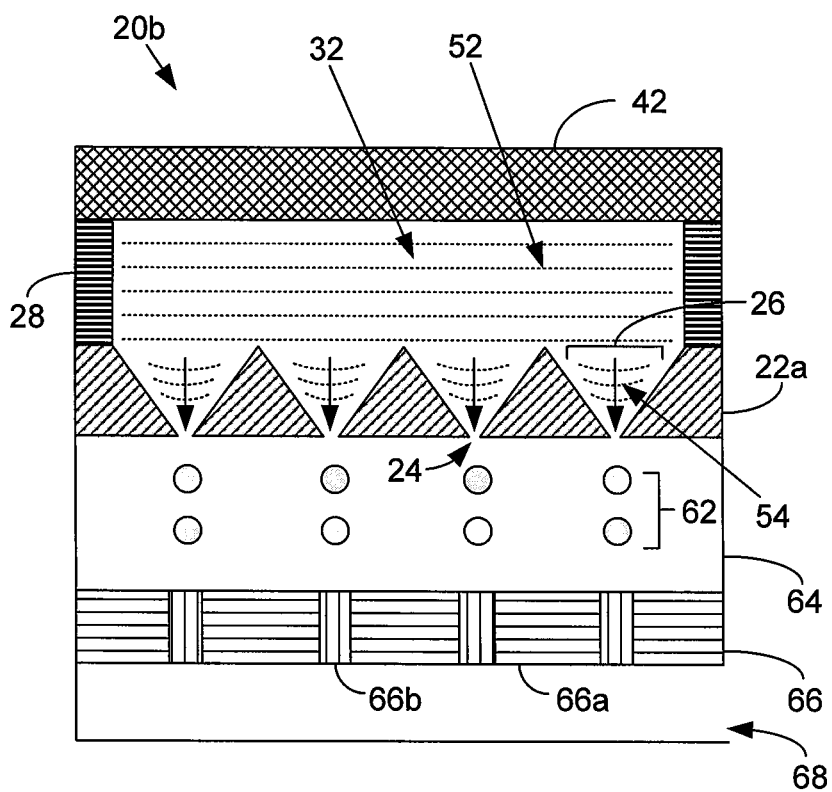

FIG. 2B is an illustration of a cross-section of an embodiment of a fuel processor 20*b*. The fuel processor 20*b* includes, but is not limited to, an planar ejector array structure 22*a* including ejector structures 26, a separating layer 28, a reservoir 32, an actuator 42, a first droplet ejection zone 64, a first catalyst layer 66, and a product removal zone 68. The components of fuel processor 20*b* illustrated in FIG. 2B are similar to those described in reference to the fuel processor 20*a* in FIG. 2A. It should be noted heat could be provided via a chemical reaction, via heated gas, and/or heating catalyst layers, and/or other components of the fuel processor 20*b*.

It should be noted that the first catalyst layer 66 is configured to have non-catalyst areas 66*a* and catalyst channels 66*b*. The catalyst channels 66*b* include one or more catalyst materials, such as the catalyst materials described in reference to the fuel processor 20*a* illustrated in FIG. 2A. The non-catalyst areas do not include a catalyst material, and may be added to modulate thermal properties (e.g., heat capacity) of the first catalyst layer.

Figure 3:
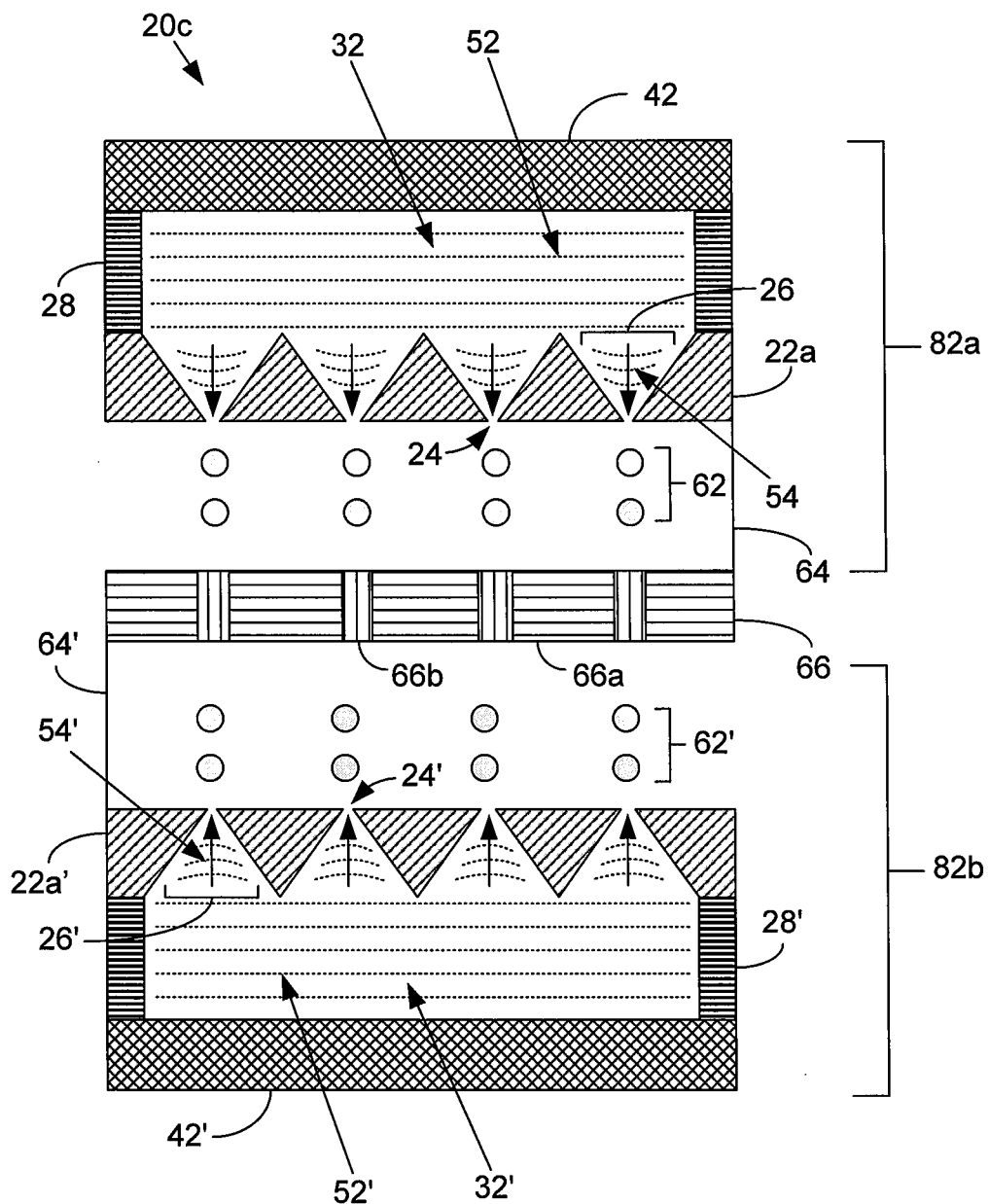
FIG. 3 is an illustration of a cross-section of another embodiment of a fuel processor.

FIG. 3 is an illustration of a cross-section of an embodiment of a fuel processor 20*c*. The fuel processor 20*c* includes a first portion 82*a* and a second portion 82*b*. Disposed between the first portion 82*a* and the second portion 82*b* is the first catalyst layer 66, which is similar to that described in reference to FIG. 2B. The first portion 82*a* and the second portion 82*b* both use the first catalyst layer 66 as will be described in greater detail herein. The first portion 82*a* includes, but is not limited to, a first planar ejector array structure 22*a* including a first ejector structure 26, a first separating layer 28, a first reservoir 32, a first actuator 42, a first droplet ejection zone 64, and a first catalyst layer 66. The second portion 82*b* includes, but is not limited to, a second planar ejector array structure 22*a'* including a second ejector structures 26', a second separating layer 28', a second reservoir 32', a second actuator 42', and a second droplet ejection zone 64'. The components described in reference to FIGS. 2A and 2B are similar to the same components described in reference to FIG. 3. The first portion 82*a* and the second portion 82*c* can include the same fluid or different fluids. It should be noted that heat could be provided via a chemical reaction, via heated gas, and/or heating catalyst layers, and/or other components of the fuel processor 20*c*.

As described in reference to FIG. 2B, the first catalyst layer 66 is configured to have non-catalyst areas 66*a* and catalyst channels 66b. The catalyst channels 66b include one or more catalyst materials, such as the catalyst materials described in reference to the fuel processor 20a illustrated in FIG. 2A. The non-catalyst areas do not include a catalyst material. It should be noted that the first and the second droplet ejection zones 64 and 64' can be used as product removal zones during the operation of the fuel processor 20c.

The fuel processor 20c can operate by generating a first set of droplets 62 and a second set of droplets 62'. The fuel processor 20c can be operated so that the first set of droplets 62 and the second set of droplets 62' are not generated at the same time, in other words, the fuel processor 20c alternates between generating the first set of droplets 62 and the second set of droplets 62'. Thus, the droplets interact with the first catalyst layer 66 in the catalyst channels 66b in an alternating manner. It has been demonstrated that reversing the flow with the appropriately selected frequency can improve reactor throughput, selectivity towards desired products (e.g., $H_2$), and stability of autothermal (without external heating) operation, and depends on the particular reaction(s), fluids, and thermal properties of the catalyst layer. Additional discussion is provided in the following: *Ind. Eng. Chem. Res.* 44 8323-33; *AIChE J.* 51 2254-64; *AIChE J.* 51 2265-72, each of which is incorporated herein by reference.

In another embodiment, the fluid to generate the first set of droplets 62 and the fluid to generate the second set of droplets 62' are different. In addition, the droplets can be generated in such a manner so that the first set of droplets 62 and the second set of droplets 62' interact with one another in the catalyst channels 66b. In this manner, the two different liquids in conjunction with the catalyst material could be used to generate products. This operation would be useful if two fluid reactants are not miscible, and thus cannot be delivered as a mixture with a single atomizer. Steam reforming of gasoline is one such example.

In another embodiment, each of the ejector nozzles of the first set of ejector structures is configured to eject droplets toward a first of set catalyst channels in the first catalyst layer. In addition, each of the ejector nozzles of the second set of ejector structures is configured to eject droplets toward a second set of catalyst channels. The first set of catalyst channels is different from the second set of ejector channels. This operation would be useful if it is desired to separate different reactions in different channels. For example, in the first set of catalyst channels, endothermic steam reforming of methanol is taking place. In the second set of channels, exothermic oxidation of methanol or hydrogen is taking place to supply the heat for the steam reforming reaction. In this way it is possible to keep the diluting gases associated with the oxidation reaction from the steam reforming reactants, and also enable autothermal operation.

Figure 4:
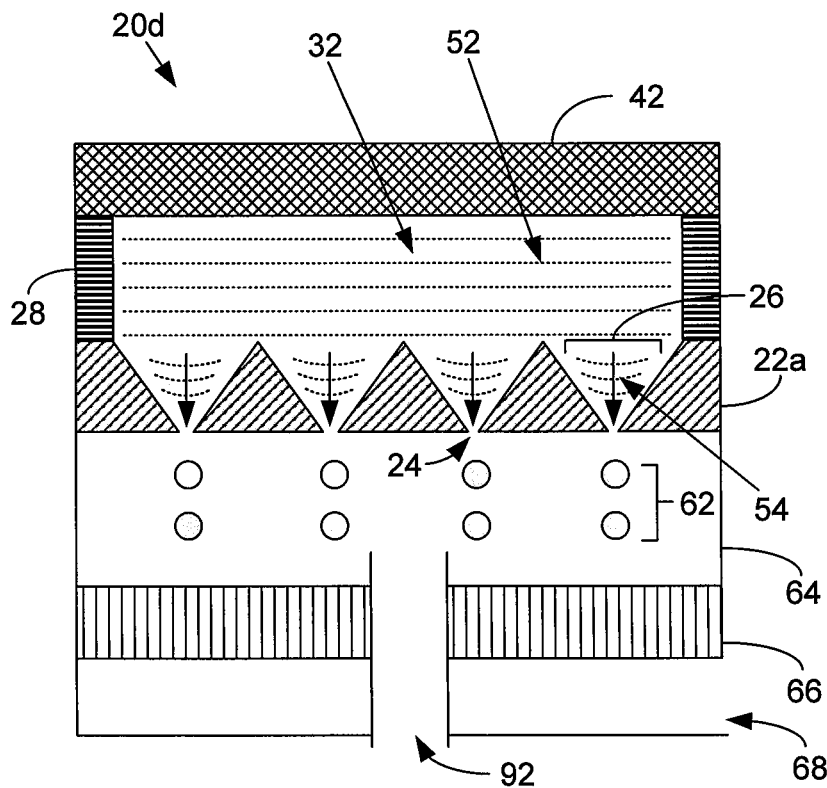
FIG. 4 is an illustration of a cross-section of another embodiment of a fuel processor.

FIG. 4 is an illustration of a cross-section of an embodiment of a fuel processor 20d. The fuel processor 20d includes, but is not limited to, a planar ejector array structure 22a including ejector structures 26, a separating layer 28, a reservoir 32, an actuator 42, a first droplet ejection zone 64, a first catalyst layer 66, and a product removal zone 68. The components of the fuel processor 20d illustrated in FIG. 4 are similar to those described in reference to the fuel processor 20a in FIG. 2A. It should be noted that heat could be provided via a chemical reaction, via heated gas, and/or via heating catalyst layers, wall layers, and/or other components of the fuel processor 20d.

It should be noted that a gas inlet 92 passes through the first catalyst layer 66. The gas inlet 92 can be used to introduce a gas or heated gas to initiate a chemical reaction or be part of the interaction of the droplets 62 with the first catalyst layer 66. The gas can be delivered to the droplet ejection zone 64 or directly into the catalyst layer 66. The gas can include, but is not limited to, air, $O_2$, water vapor, argon, carbon monoxide, methane or other gaseous hydrocarbons, and combinations thereof. In an embodiment, the gas is air, and the fluid is a methanol and water mix (80%/20% molar mixture). The air and droplets interact with the catalyst material (Cu/ZnO/$Al_2O_3$) and undergo autothermal reforming to generate products that include at least $H_2$.

The dimensions of the gas inlet 92 are sufficient to flow gas into the droplet ejection zone 64. In an illustrative embodiment, the diameter of the gas inlet 92 is about 50 micrometers to 5 millimeters and the length of the gas inlet 92 is about 1 centimeter to 10 centimeters. The gas inlet 92 can be made of materials such as, but not limited to, ceramic, steel, aluminum, and combinations thereof.

Figure 5:
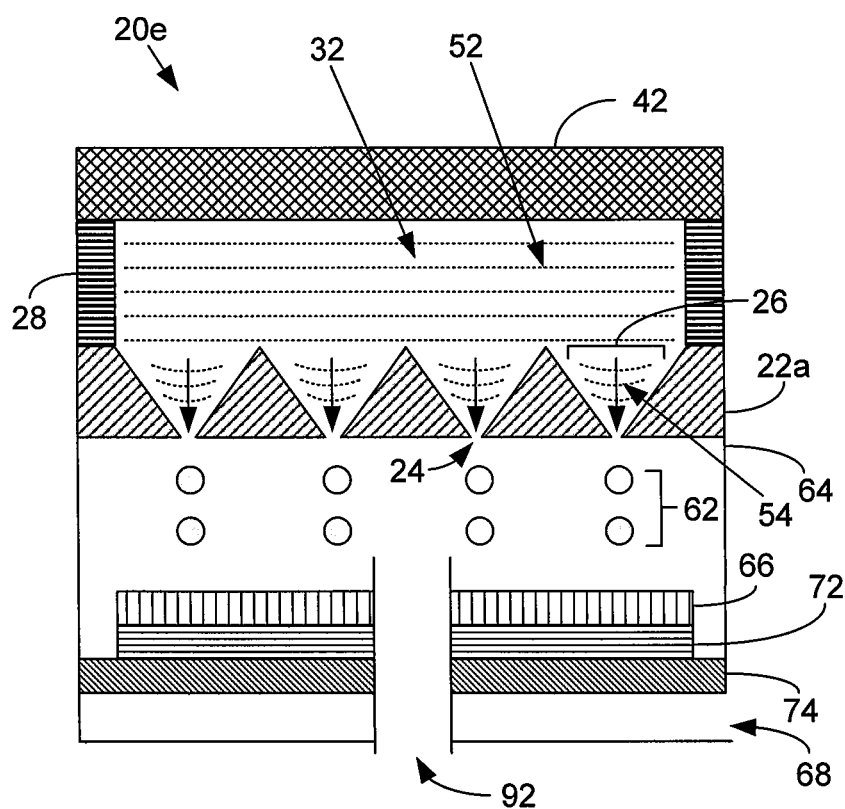
FIG. 5 is an illustration of a cross-section of another embodiment of a fuel processor.

FIG. 5 is an illustration of a cross-section of an embodiment of a fuel processor 20e. The fuel processor 20e includes, but is not limited to, an planar ejector array structure 22a including ejector structures 26, a separating layer 28, a reservoir 32, an actuator 42, a first droplet ejection zone 64, a first catalyst layer 66, a second catalyst layer 72, and a product removal zone 68. The components of the fuel processor 20e illustrated in FIG. 5 are similar to those described in reference to the fuel processor 20a in FIG. 2A. It should be noted that heat could be provided via a chemical reaction, via heated gas, and/or via heating catalyst layers, wall layers, and/or other components of the fuel processor 20e.

It should be noted that the first catalyst layer 66 is disposed on a second catalyst layer 72. The second catalyst layer 72 is disposed on a wall layer 74. The gas inlet 92 passes through the first catalyst layer 66, the second catalyst layer 72, and the wall layer 74. The gas inlet 92 can be used to introduce a gas or heated gas to initiate a chemical reaction or be part of the interaction of the droplets 62 with the first catalyst layer 66. The gas inlet 92 can also supply gas directly to either the first catalyst layer 66, the second catalyst layer 72, or both.

The catalyst materials to be included in each of the first catalyst layer 66 and the second catalyst layer 72 can be selected from those listed herein based on the reaction intended for the components (e.g., fluid components, injected gas components, and reaction products of one or more reactions). In an embodiment, the first catalyst layer 66 includes an oxidation catalyst. The second catalyst layer 72 includes a reforming catalyst. In this regard, the first catalyst layer 66 can include a Pt/$Al_2O_3$ catalyst, while the second catalyst layer 72 includes Cu/ZnO/$Al_2O_3$ pellets. The fluid includes a 80%/20% molar mixture of methanol to water and the gas flow is air. Methanol oxidation occurs in the first catalyst layer 66, which provides heat to the second catalyst layer 72. The remaining un-reacted reagents (e.g., methanol and steam are supplied in excess of what is needed for stoichiometric oxidation of methanol by air) flow into second catalyst layer, where a reaction occurs to convert these components into products, including hydrogen, within the second catalyst layer by steam reforming. Additional discussion regarding multiple catalyst layers are described in reference to FIGS. 6 and 7.

Figure 6:
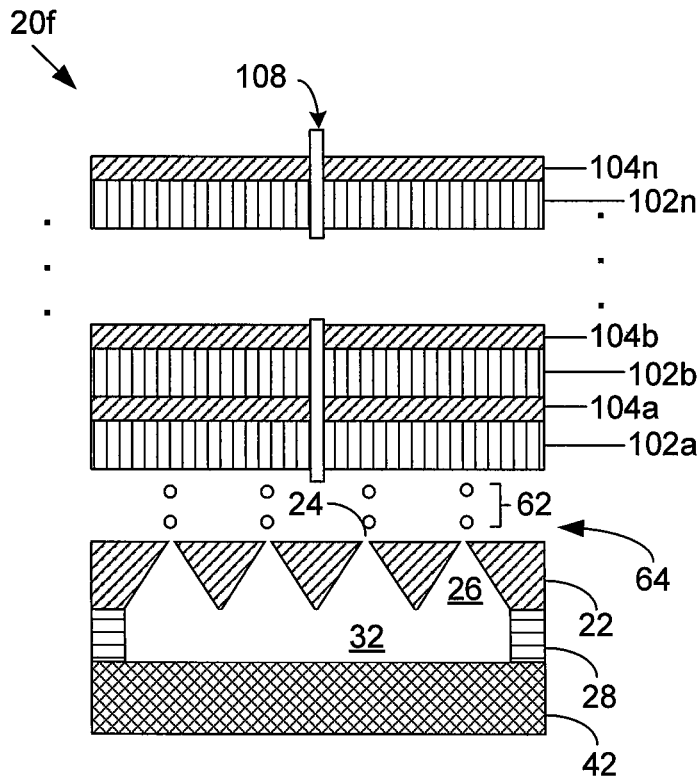
FIG. 6 is an illustration of a cross-section of another embodiment of a fuel processor.

FIG. 6 is an illustration of a cross-section of an embodiment of a fuel processor 20f. The fuel processor 20f includes, but is not limited to, an planar ejector array structure 22a including ejector structures 26, a separating layer 28, a reservoir 32, an actuator 42, a first droplet ejection zone 64, a plurality of catalyst layers (e.g., first catalyst layer 102a, a second catalyst layer 102b, and up to an "n" catalyst layer 102n, where "n" can be 3 to 10, for example), a wall layer (e.g., a first wall layer 114a, a second wall layer 114b, and up to an "n" wall layer 114n, where "n" can be 3 to 10, for example), and a gas inlet 108. The components of the fuel processor 20g illustrated in FIG. 5 are similar to those described in reference to the fuel processor 20a in FIG. 2A. It should be noted that a plurality of gas inlets could be used to introduce one or more gases to the same or different catalyst layers.

The catalyst layers (e.g., first catalyst layer 102a, a second catalyst layer 102b, and up to an "n" catalyst layer 102n) can each include the same catalyst material or they can include different catalyst material (e.g., each catalyst layer can include a different catalyst material or at least one of the catalyst layers can include a different catalyst material than the other catalyst layers). The catalyst layers can have dimensions similar to those described in reference to FIGS. 2A-5.

The wall layers (e.g., a first wall layer 114a, a second wall layer 114b, and up to an "n" wall layer 114n) can be impermeable, semi-permeable, or permeable, to the reactants and/or products in the fuel processor. The wall layers can be the same type of wall layer or different types of wall layers (e.g., each of the wall layers are different, or at least one wall layer is different than the other wall layers). The wall layers can have dimensions similar to the catalyst layers. The wall layers can have different thermal conductivity and/or heat capacity to manage the amount and rate of heat transfer across the walls.

The wall layer can be made of low thermal conductivity material to minimize thermal coupling between the zones that are separated by this wall layer. In the alternative, the wall layer can be made of high thermal conductivity material to maximize thermal coupling between the zones, which are separated by this wall layer. In addition, the wall layer can be made of low heat capacity material to minimize time lag between thermal responses (temperature change) in the adjacent zones, which are separated by this wall layer. Furthermore, the wall layer can be made of high heat capacity material to maximize the time lag between thermal responses (temperature change) in the adjacent zones, which are separated by this wall layer.

The impermeable wall layer prevents or substantially prevents (e.g., less than 0.1% permeable) the reactants and products from passing through the wall layer. As noted in FIG. 7, the impermeable wall layer can include one or more opening to allow the reactants and/products to flow from one catalyst layer to another catalyst layer. The impermeable wall layer can be made of materials such as, but not limited to, steel, aluminum, copper, and solid ceramic.

The permeable wall layer allows the reactants and products to pass through the wall layer. The permeable wall layer can be made of materials such as, but not limited to, ceramic foam, metallic mesh, packed bed, and other porous media.

The composition of the semi-permeable wall layer depends upon which reactants and products the user wants to pass through the wall layer. The semi-permeable wall layer can include one or more opening to allow the reactants and/or products to flow from one catalyst layer to another catalyst layer. In an embodiment, two wall layers can be semi-permeable, but are selectively permeable to different reactants and/or products. The composition of the semi-permeable wall layer can include, but is not limited to, Pd or 77% Pd/23% Ag metal alloy membranes, perovskyte ceramic mixed ionic-electronic membranes, polymer or zeolite membranes, and the like. These membranes may be selectively permeable to, but not limited, hydrogen, oxygen, water vapor, carbon monoxide, carbon dioxide, and other chemical species. These membranes may be composite materials, designed to separate more than one chemical species, and also having tailored thermophysical properties (thermal conductivity and heat capacity) to enable desired thermal management.

In general, the ejector structures 26 eject fluid droplets 62 into the droplet ejection zone 64. In addition, a gas can be pumped into the droplet ejection zone 64. A reaction can occur in the droplet ejection zone 64 and/or in the first catalyst layer 102a. The products and/or the reactants or select products and reactants can flow into the second catalyst layer 102b through the wall layer 104a and/or through an opening in the wall layer 104a. A reaction occurs in the second catalyst layer 102b between/among the remaining components and using the second catalyst material. It should also be noted that gas inlets could be in gaseous communication with each layer so that select gases can be flowed into specific layers. The products and/or the reactants or select products and reactants can flow into the n catalyst layer 102n through the wall layer 104b and/or through an opening in the wall layer 104b. A reaction occurs in the "n"-th catalyst layer 102n between/among the remaining components and using the catalyst material. This process or a similar process (depending on the remaining components, the catalyst layer, and the wall layer) can occur one or more times to produce one or more products. It should be noted that heat could be provided via a chemical reaction, via heated gas, and/or via heating catalyst layers, wall layers, and/or other components of the fuel processor 20f. Additional details regarding embodiments of the present disclosure are described in reference to FIG. 7.

As mentioned above, the catalyst material can include an oxidative catalyst, a reforming catalyst, a water-gas shift catalyst, a decomposition catalyst, a PROX catalyst, and combinations thereof. The different catalyst layers can be selected to perform different functions, to produce specific products, to consume specific products to generate heat, to consume heat and the like. Likewise, the wall layers can be selected to perform different functions such as being semi-permeable to select products or reactants to separate desired products and/or to shift the equilibrium of the subsequent reactions, to a desired direction and optimize generation of desired products. Thus, appropriate selection of the catalyst layers and wall layers can optimize the operation of the fuel processor 20f and optimize the generation of desired products (e.g., $H_2$) and/or reduce the formation of by-products that are harmful to the formation of the desired products and/or harmful to the fuel cell, components of the fuel cell, or the environment (e.g., CO and $H_2S$).

Figure 7:
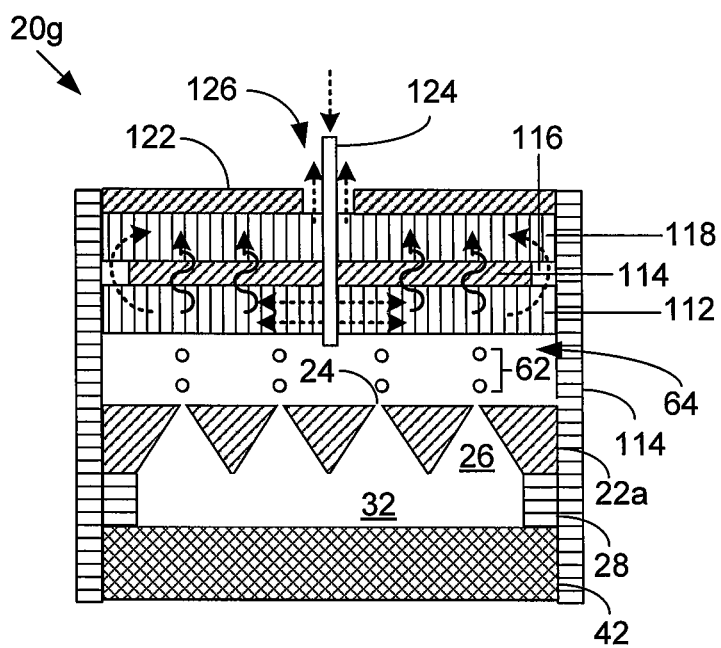
FIG. 7 is an illustration of a cross-section of another embodiment of a fuel processor.

FIG. 7 is an illustration of a cross-section of an embodiment of a fuel processor 20g. The fuel processor 20g includes, but is not limited to, a planar ejector array structure 22a including ejector structures 26, a separating layer 28, a reservoir 32, an actuator 42, a first droplet ejection zone 64, a first catalyst layer 112, a first wall layer 114, a second catalyst layer 118, a second wall layer 122, a gas inlet 124, and a product exit 126. In addition, the first wall layer 114 includes openings 116 for the products and/or reactants to flow from the first catalyst layer 114 to the second catalyst layer 118. The components of the fuel processor 20g illustrated in FIG. 7 are similar to those described in reference to the fuel processor 20a in FIG. 2A and fuel processor 20f in FIG. 6.

In an embodiment, the first catalyst layer 112 can include a $Pt/Al_2O_3$ catalyst (combustion catalyst), while the second catalyst layer 118 can include a $Cu/ZnO/Al_2O_3$ catalyst (reforming catalyst). The fluid is a methanol/water mixture (80%/20% molar mixture) and the gas is air. Methanol oxidation occurs in the first catalyst layer 112, which provides heat to the second catalyst layer 118. The remaining unreacted reagents (e.g., methanol and steam are supplied in excess of what is needed for stoichiometric oxidation of methanol by air) flow into the second catalyst layer 118 through the opening 116 in the first wall layer 114. A reaction occurs to convert these components into products including hydrogen within the second catalyst layer 118 by steam reforming. The remaining products and reactants flow out of an exit 126 through the second wall layer 122. In an embodiment (not shown), the first wall layer 114 is impermeable to the reactants and products. In another embodiment, the first wall layer 114 and/or the second wall layer 122 is semipermeable to steam, $H_2$, carbon monoxide, carbon dioxide, and combinations thereof.

Figure 8:
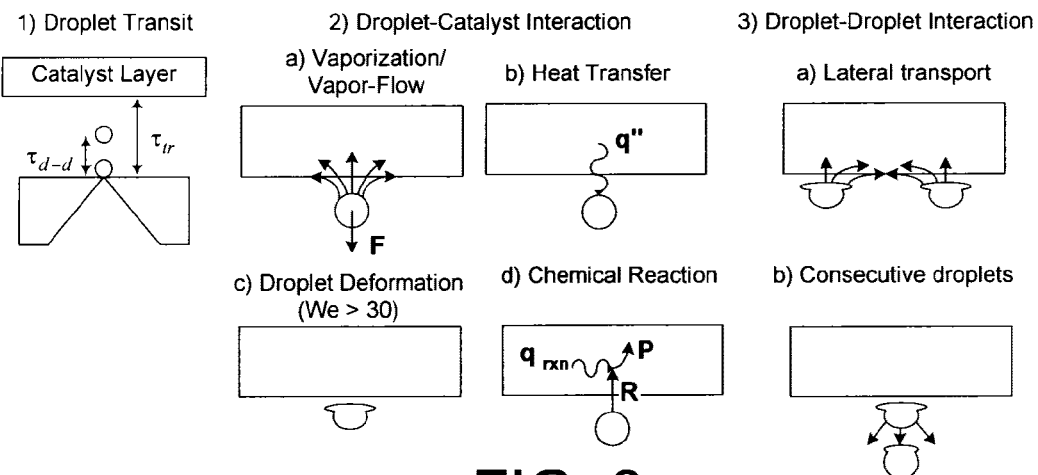
FIG. 8 is an illustration of the droplet evolution in an impingement reactor.

Several processes are involved from the ejection of a droplet to its interaction with the hot catalyst surface and eventual conversion to product gases. The diagram shown in FIG. 8 depicts the evolution of a droplet in the impingement reactor along with the relevant transport processes.

1) The first step is transport of the droplet to the catalyst surface. The time it takes for the droplet to reach the catalyst surface from the ejection point, $T_{tr}$, depends on the initial velocity, the ejector-catalyst distance, the drag force acting on a moving droplet, and droplet evaporation rate. The time between subsequent droplet ejections, $T_{d-d}$, is determined by the frequency of ejector operation and will affect the interaction of consecutive droplets on the catalyst as discussed below.

2) Once the droplet comes in close vicinity to the catalyst layer a number of processes occur simultaneously, all of which influence one another. These include:

a) Droplet vaporization generates a vapor flow field around the droplet, and is affected by the presence of the catalyst surface such that a force is developed which pushes the droplet away from the surface. If this force is great enough, the droplet is supported above the surface by its vapor, and this is known as the Leidenfrost regime. If the catalyst surface is very porous, then much of the vapor will be able to penetrate into the pores and the force will be reduced. In this case the catalyst surface temperature required to support the droplet (Leidenfrost temperature) is much greater than it would be for a solid surface (*International Journal of Heat and Mass Transfer* 35 pp 2377-88). For small droplets with low velocities (low Re), the vapor induced force could be sufficient to push the droplet far away from the droplet surface before it fully vaporizes. This is certainly an undesirable regime for the impingement reactor and should be avoided.

b) Heat transfer from the catalyst surface to the droplet can occur by conduction through the stagnant vapor, convection induced by the flowing vaporized fuel, and radiation. The relative magnitudes of these can be estimated given surface and droplet temperatures and droplet-surface distance. Heat transfer from hot surface to droplet will determine the droplet evaporation rate and thus the velocity of the vapor flow around the droplet and the induced force. A reliable source is required to supply the heat necessary for evaporation.

c) Droplet deformation upon impact with the surface can affect the heat transfer and flow field, and thus the evaporation rate (*Journal of Fluid Mechanics* 573 pp 311-37). This also influences the interaction of adjacent droplets as discussed below. The degree of droplet deformation is determined by the droplet Weber number ($We = 2\rho_f V^2 R / \sigma$), the ratio of inertial to surface tension forces. For $We<30$, surface tension dominates and the droplet does not deform, for $30<We<80$, the droplet spreads out over the surface, then recoils once the inertial energy has been transferred to the surface tension at the leading edge of the spread, and at $We>80$, the inertial force causes splashing and subsequent break up into smaller satellite droplets (*Physics of Fluids* 17 noted above).

d) The vaporized fuel reactants (R) that come into contact with the catalyst are converted to products and the heat generated by some exothermic reactions may be used for endothermic reactions, as well as supply heat for the fuel vaporization and thus make autothermal operation (with no external heat supply) possible.

3) In an actual reactor, the droplet evolution does not occur in isolation, and there will be an array of droplet streams that could potentially influence performance.

a) If the distance between adjacent droplet streams is small enough, then for high We number impacts, the splashing radius could overlap. Also, vaporization induced flows that spread out radially from impact points could intersect.

b) In a single droplet stream, the evolution of one droplet could affect that of subsequent droplets. For example, if the vaporization is slow or the vapor induced repulsive force is strong, then droplet collisions could occur. Even if full vaporization occurs before the next droplet impact, the residual vapor flow pattern could influence the next droplet's evolution.

Accounting for all of the phenomena is important to achieving optimum reactor performance for a given set of reactants, catalysts, and desired products. For example, it is important that the droplet impacts the catalyst surface before the drag forces and repulsive forces due to vapor generation force the droplet away so that most of the reactants contact the first catalyst layer. Smaller droplets have a higher specific surface area, so the distance between the atomizer and first catalyst layer must be smaller than it would be for bigger droplets. The exact distance is determined by the droplet velocity, composition, surrounding gas composition, and catalyst temperature. Another important consideration is the droplet feed rate. Feeding the droplets too fast could cause liquid accumulation on the first catalyst surface if the heat supplied to the catalyst to vaporize the droplets (by reaction, electrical heating, etc.) is insufficient. This would lead to flooding and deactivation of the catalyst. Thus, there is a maximum feed rate depending on the particular liquid, droplet size, catalyst structure, and heat input rate.

It may also be advantageous to operate the reactor in a transient mode by dynamically changing and matching the rate of the fuel droplet ejection to the relevant time scales of the key transport (evaporation and mixing), reaction and separation processes taking place in the reactor. This can be accomplished, for example, by dynamically changing the duty cycle of the ejector during the operation to selectively enhance one or several desired processes mentioned above.

While embodiments of the present disclosure are described in connection with the Examples and the corresponding text and figures, there is no intent to limit the disclosure to the embodiments in these descriptions. On the contrary, the intent is to cover all alternatives, modifications, and equivalents included within the spirit and scope of embodiments of the present disclosure.

EXAMPLE 1

Figure 9A:
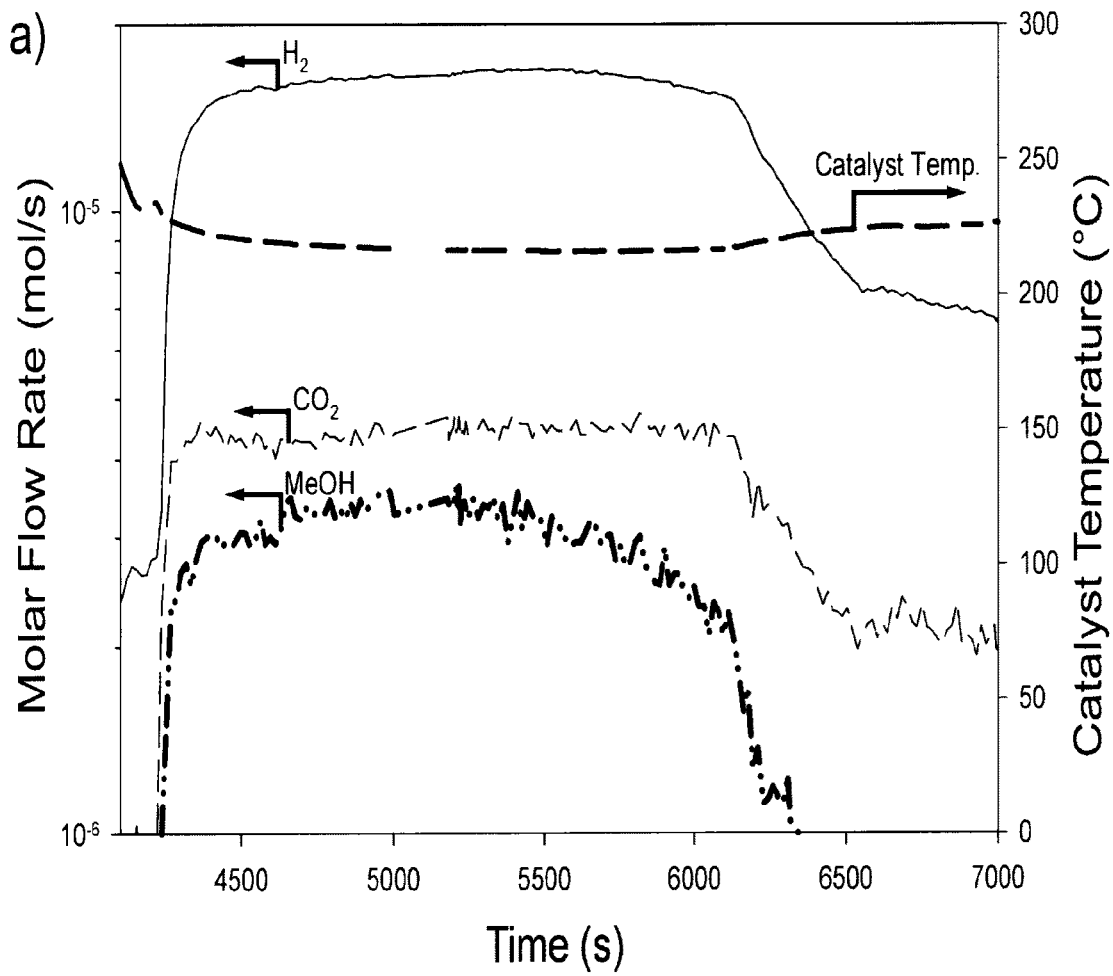
FIGS. 9A and 9B illustrate graphs depicting hydrogen production results for a droplet impingement reactor.
Figure 9B:
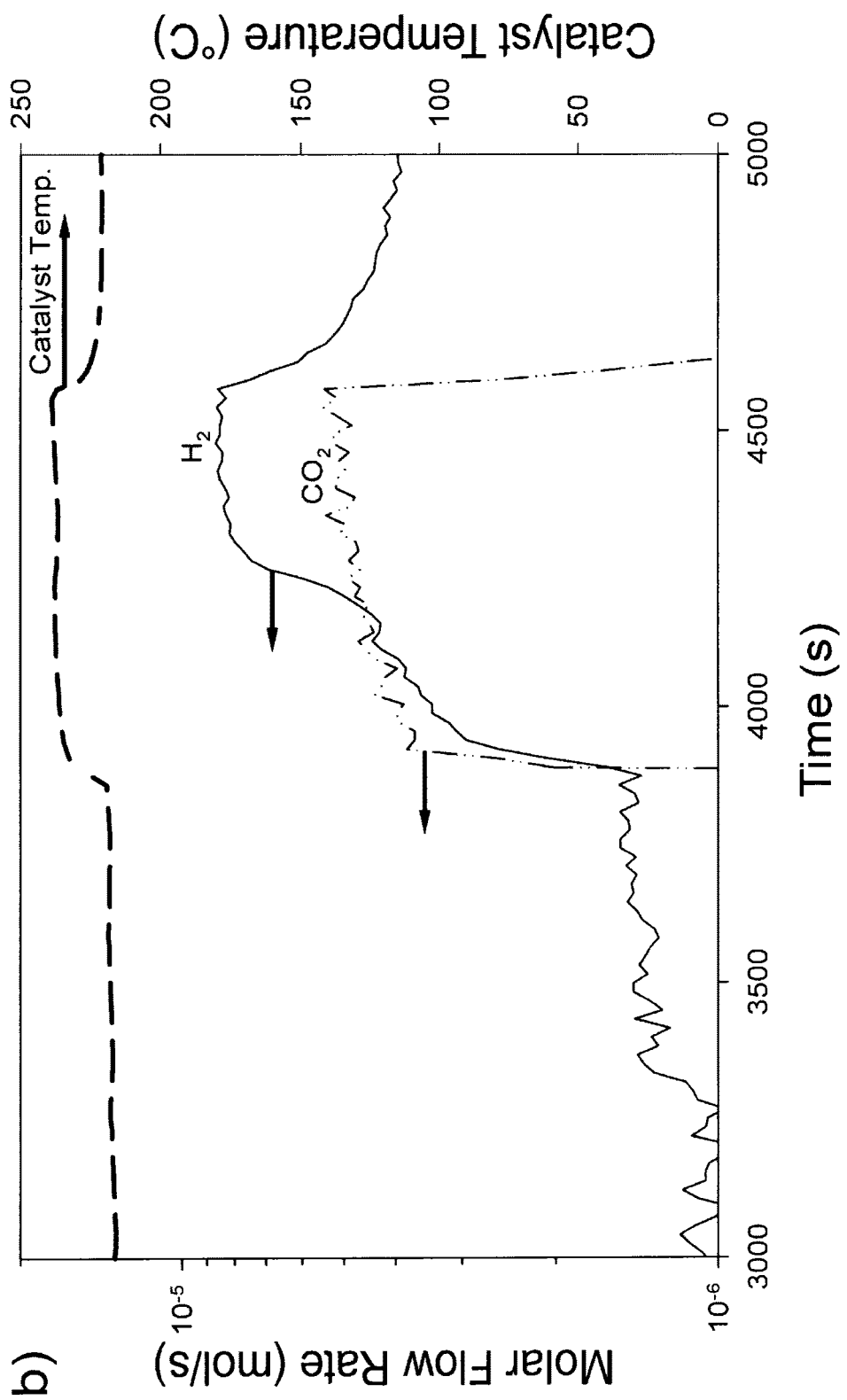

The results of representative experiments for steam reforming and partial oxidation of methanol using the droplet impingement reactor are shown in FIGS. 9A and 9B, showing significant methanol conversion and hydrogen production. The details of the reactor design can be found in *J. Micromech. Microeng.*, 17 (9), S257-S264 (2007), which is incorporated herein by reference. The steam reforming catalyst used was a commercial catalyst (BASF F3-01) including $CuO/ZnO/Al_2O_3$ in the form of 1.5 mm×1.5 mm cylindrical pellets arranged in a single layer over the atomizer. The oxidation catalyst was a platinum coated stainless steel mesh with approximately 25 μm openings, stacked in 4 layers above the atomizer. Both catalyst types were placed approximately 1 cm away from the atomizer surface and were heated to ~220° C. using electrical resistance heaters before beginning the experiments. The atomizer used in these experiments produced multiple streams of 25 μm droplets at a frequency of 900 kHz. The product gases were swept by 150 sccm of argon into a Hiden HPR20 quadrupole mass spectrometer for composition analysis. Tests were run multiple times for both steam reforming and partial oxidation and consistent results were observed for each run. The results are as expected with more hydrogen produced in steam reforming, but at a lower conversion since the reaction is kinetically limited and thus proceeds more slowly than the partial oxidation.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

What is claimed is:

1. A method, comprising:
   providing a fuel processor having:
   a first reservoir configured to store a first fluid;
   a first planar ejector array structure disposed in communication with the first reservoir to generate droplets of the first fluid;
   a first droplet ejection zone for receiving droplets ejected from the first planar ejector array structure;
   a catalyst layer disposed on an opposite side of the first droplet ejection zone as the first planar ejector array structure, wherein the droplets of the first fluid interact with the catalyst layer to form products; and
   a product removal zone, wherein the catalyst layer is disposed between the droplet ejection zone and the product removal zone, wherein the droplets of the first fluid interact with the catalyst layer to form products that pass through the catalyst layer into the product removal zone,
   wherein the first planar ejector array structure comprises an array of ejector nozzles, wherein the first planar ejector array structure and the catalyst layer are in parallel planes and face one another, wherein the catalyst layer includes alternating areas of a catalyst area and a non-catalyst area, wherein each catalyst area is a catalyst channel, wherein each catalyst channel corresponds to and is disposed in-line with one of the ejector nozzles so the droplets from each ejector nozzle contact the corresponding catalyst channel, wherein the non-catalyst area is disposed between the catalyst channels so that the droplets ejected from each of the ejector nozzles interacts with a separate catalyst channel;
   ejecting the first fluid through the first planar ejector array to form droplets of the first fluid;
   reacting the first fluid in the product removal zone to form a first set of reaction products, wherein the reaction products include $H_2$;
   separating $H_2$ from the reaction products; and
   dynamically changing and matching a rate of the droplet ejection from the first planar ejector array to a time scale of one or more of the transport, reaction, and separation processes.

2. The method of claim 1, further comprising:
   providing a second catalyst layer including a second catalyst, wherein the second catalyst layer is disposed on the catalyst layer on the side opposite the droplet ejection zone; and
   reacting one or more of the reaction products at the second catalyst to generate a second set of reaction products.

3. The method of claim 1, further comprising:
   providing a second catalyst layer including a second catalyst;
   providing a wall layer disposed between the first catalyst layer and the second catalyst layer, wherein the wall layer is selected from a chemical species permeable wall layer and a chemical species semi-permeable wall layer, wherein the wall layer is permeable to at least one chemical species selected from $H_2$, $H_2O$, CO, $CO_2$ and combinations thereof; and
   flowing at least one of the first set of reaction products through the wall layer into the second catalyst layer.

4. The method of claim 3, wherein the first catalyst and the second catalyst are selected from an oxidation catalyst, a reforming catalyst, a water-gas shift catalyst, a decomposition catalyst, or a CO preferential oxidation (PROX) catalyst, wherein the first catalyst and the second catalyst are not the same catalyst material.

5. The method of claim 1, wherein the fuel processor further comprises: a gas inlet that passes through the catalyst layer and a wall layer disposed on the catalyst layer on the side opposite the droplet ejection zone, wherein the gas inlet passes through the wall layer; and wherein the method further comprises the step of:
   pumping a gas into the droplet ejection zone through the gas inlet.

6. The method of claim 5, wherein the fuel processor further comprises: a second set of layers including a second catalyst layer and a second wall layer, wherein the second catalyst layer is disposed on the wall layer, wherein the second wall layer is disposed on the second catalyst layer, and wherein the gas inlet passes through the second catalyst layer and the second wall layer.

7. The method of claim 1, wherein the catalyst layer includes a catalyst selected from: an oxidation catalyst, a reforming catalyst, a water-gas shift catalyst, decomposition catalyst, a CO preferential oxidation catalyst, and combinations thereof.

8. The method of claim 5, wherein the wall layer is selected from a chemical species permeable wall layer and a chemical species semi-permeable wall layer, wherein the wall layer is selectively permeable to at least one chemical species selected from $H_2$, $H_2O$, CO, $CO_2$, and a combination thereof.

9. A method, comprising:
providing a fuel processor having:
- a first reservoir configured to store a first fluid;
- a first planar ejector array structure disposed in communication with the first reservoir to generate droplets of the first fluid;
- a first droplet ejection zone for receiving droplets ejected from the first planar ejector array structure;
- a catalyst layer disposed on an opposite side of the first droplet ejection zone as the first planar ejector array structure, wherein the droplets of the first fluid interact with the catalyst layer to form products;
- a gas inlet that passes through the catalyst layer and a wall layer disposed on the catalyst layer on a side opposite the droplet ejection zone, wherein the gas inlet passes through the wall layer; and
- a second set of layers including a second catalyst layer and a second wall layer, wherein the second catalyst layer is disposed on the wall layer, wherein the second wall layer is disposed on the second catalyst layer, and wherein the gas inlet passes through the second catalyst layer and the second wall layer;

pumping a gas into the droplet ejection zone through the gas inlet;
ejecting the first fluid through the first planar ejector array to form droplets of the first fluid;
reacting the first fluid at the first catalyst layer to form a first set of reaction products, wherein the reaction products include $H_2$;
separating $H_2$ from the reaction products; and
dynamically changing and matching a rate of the droplet ejection from the first planar ejector array to a time scale of one or more of the transport, reaction, and separation processes.

10. The method of claim 9, further comprising:
providing a second catalyst layer including a second catalyst, wherein the second catalyst layer is disposed on the catalyst layer on the side opposite the droplet ejection zone; and
reacting one or more of the reaction products at the second catalyst to generate a second set of reaction products.

11. The method of claim 9, further comprising:
providing a second catalyst layer including a second catalyst;
providing a wall layer disposed between the first catalyst layer and the second catalyst layer, wherein the wall layer is selected from a chemical species permeable wall layer and a chemical species semi-permeable wall layer, wherein the wall layer is permeable to at least one chemical species selected from $H_2$, $H_2O$, CO, $CO_2$ and combinations thereof; and
flowing at least one of the first set of reaction products through the wall layer into the second catalyst layer.

12. The method of claim 11, wherein the first catalyst and the second catalyst are selected from an oxidation catalyst, a reforming catalyst, a water-gas shift catalyst, a decomposition catalyst, or a CO preferential oxidation (PROX) catalyst, wherein the first catalyst and the second catalyst are not the same catalyst material.

13. The method of claim 9, wherein the first planar ejector array structure comprises an array of ejector nozzles, wherein the first planar ejector array structure and the catalyst layer are in parallel planes and face one another, wherein the catalyst layer includes alternating areas of a catalyst area and a non-catalyst area, wherein each catalyst area is a catalyst channel, wherein each catalyst channel corresponds to and is disposed in-line with one of the ejector nozzles so the droplets from each ejector nozzle contact the corresponding catalyst channel, wherein the non-catalyst area is disposed between the catalyst channels so that the droplets ejected from each of the ejector nozzle interacts with a separate catalyst channel, and wherein the fuel processor further comprises:
- a product removal zone, wherein the catalyst layer is disposed between the droplet ejection zone and the product removal zone, wherein the droplets of the first fluid interact with the catalyst layer to form products that pass through the catalyst layer into the product removal zone; and
- reacting the first fluid in the product removal zone to form a first set of reaction products.

14. The method of claim 9, wherein the catalyst layer includes a catalyst selected from: an oxidation catalyst, a reforming catalyst, a water-gas shift catalyst, decomposition catalyst, a CO preferential oxidation catalyst, and combinations thereof.

15. The method of claim 9, wherein the wall layer is selected from a chemical species permeable wall layer and a chemical species semi-permeable wall layer, wherein the wall layer is selectively permeable to at least one chemical species selected from $H_2$, $H_2O$, CO, $CO_2$, and a combination thereof.

* * * * *

UNITED STATES PATENT AND TRADEMARK OFFICE
CERTIFICATE OF CORRECTION

PATENT NO. : 8,603,205 B2  Page 1 of 1
APPLICATION NO. : 13/018614
DATED : December 10, 2013
INVENTOR(S) : Andrei G. Fedorov et al.

It is certified that error appears in the above-identified patent and that said Letters Patent is hereby corrected as shown below:

In the Specification:

Column 6, line 40, delete "26" and replace with --24--

In the Claims:

Column 19, Claim 9, line 7, delete "first"

Column 19, Claim 9, line 9, delete "first"

Signed and Sealed this
Third Day of June, 2014

Michelle K. Lee
*Deputy Director of the United States Patent and Trademark Office*